US012423642B2

United States Patent
Cohen et al.

(10) Patent No.: US 12,423,642 B2
(45) Date of Patent: Sep. 23, 2025

(54) TECHNIQUES FOR PROGRAMMATICALLY UPDATING THE STATUS OF ASSETS TRACKED IN A SUPPLY CHAIN ENVIRONMENT

(71) Applicant: Cox Communications, Inc., Atlanta, GA (US)

(72) Inventors: Alexis Cohen, Atlanta, GA (US); Jacob Mapel, Atlanta, GA (US); Hunter Shinn, Atlanta, GA (US); Zach Ritter, Atlanta, GA (US); David Lee, Atlanta, GA (US); Amanda Marotti, Atlanta, GA (US); Barbara Hernandez, Atlanta, GA (US)

(73) Assignee: Cox Communications, Inc., Atlanta, GA (US)

( * ) Notice: Subject to any disclaimer, the term of this patent is extended or adjusted under 35 U.S.C. 154(b) by 0 days.

(21) Appl. No.: 18/597,036

(22) Filed: Mar. 6, 2024

(65) Prior Publication Data

US 2024/0211854 A1 Jun. 27, 2024

Related U.S. Application Data

(63) Continuation of application No. 17/809,857, filed on Jun. 29, 2022, now Pat. No. 11,954,636.

(51) Int. Cl.
*G06Q 10/0833* (2023.01)
*G06F 9/448* (2018.01)

(52) U.S. Cl.
CPC ....... *G06Q 10/0833* (2013.01); *G06F 9/4498* (2018.02)

(58) Field of Classification Search
CPC .................. G06Q 10/0832; G06Q 10/0833
See application file for complete search history.

(56) References Cited

U.S. PATENT DOCUMENTS

| | | | |
|---|---|---|---|
| 2009/0015400 A1* | 1/2009 | Breed | G07C 9/28 340/539.22 |
| 2009/0313072 A1* | 12/2009 | Balok | G06Q 10/0631 705/333 |
| 2019/0156273 A1* | 5/2019 | Fisher | G06N 3/08 |
| 2021/0160327 A1* | 5/2021 | Jantzi | H04L 67/12 |
| 2023/0214792 A1* | 7/2023 | Lee | G06Q 20/02 705/75 |
| 2023/0289709 A1* | 9/2023 | Avidar | G06K 19/06028 |

OTHER PUBLICATIONS

Hetal Bhavsar, "A Comparative Study of Training Algorithms for Supervised Machine Learning", 2012, p. 74-76 (Year: 2012).*

* cited by examiner

*Primary Examiner* — Ibrahim N El-Bathy
(74) *Attorney, Agent, or Firm* — Eversheds Sutherland (US) LLP

(57) ABSTRACT

This disclosure describes systems, methods, and devices related to programmatically updating the status of assets tracked in a supply chain environment. A system may be configured to obtain first sensor data collected from a first tracking device associated with a first asset, determine asset workflow information associated with the first asset, determine an intelligence engine configured to generate an inference of a status associated with the first asset, determine the status associated with the first asset, wherein the status is determined by the intelligence engine based on the first sensor data and the asset workflow information, and store the status of the first asset in an asset tracking database.

20 Claims, 8 Drawing Sheets

TECHNIQUES FOR PROGRAMMATICALLY UPDATING THE STATUS OF ASSETS TRACKED IN A SUPPLY CHAIN ENVIRONMENT

CROSS REFERENCE TO RELATED APPLICATIONS

This application is a continuation of, and claims priority to, U.S. application Ser. No. 17/809,857 filed Jun. 29, 2022, the disclosure of which is incorporated herein by reference in its entirety.

TECHNICAL FIELD

This disclosure generally relates to systems and methods for providing automated status tracking of assets in the context of a supply chain using portable tracking devices such as Internet-of-Things (IoT)-based devices. Techniques described herein may be utilized to track and update the status of an asset within the context of a workflow and programmatically inference that an asset has been paired with or un-paired from an asset.

BACKGROUND

In the context of supply chain management, there are many challenges involved in the successful delivery of assets. The ability to track and update the status of assets is desirable and/or imperative in many scenarios. There are many challenges involved in the implementation of automated status tracking of assets in a supply chain context—for example, the reliance on manual or human intervention is often prone to human error, is unreliable, and slow. These shortcoming can negatively impact the ability of individuals and organizations to properly utilize available resources. For example, in such may be the case of a manufacturing component, where having accurate and up-to-date information on the status of a manufacturing component as being consumed or available in a manufacturing facility or other facility can provide critical information that is used to determine whether a manufacturing step can be performed, how to allocate or re-allocate the distribution of scarce resources, and more.

Figure 1:
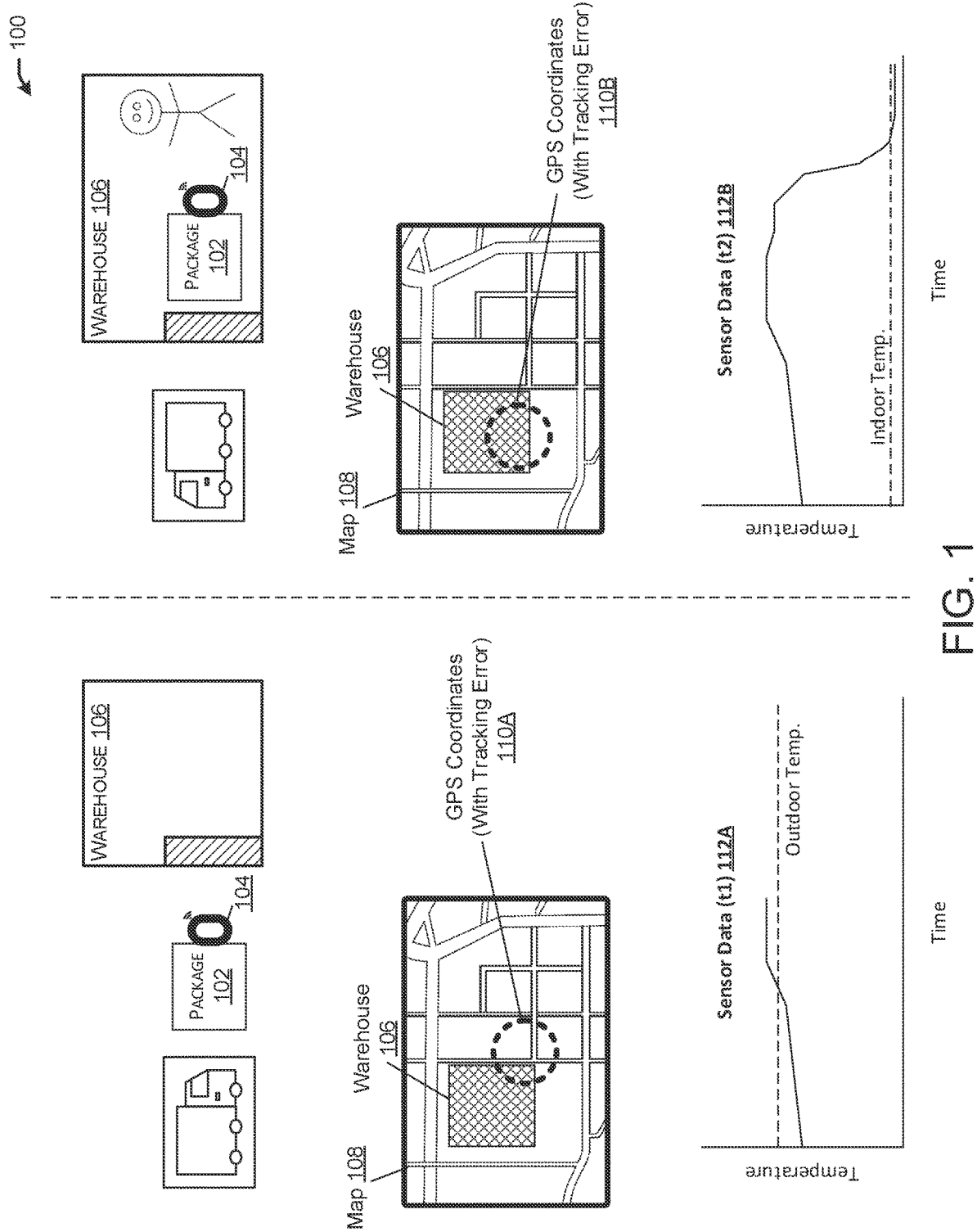
FIG. 1 illustrates an example environment in which techniques for programmatically updating the status of assets tracked in a supply chain environment may be implemented, in accordance with one or more embodiments of the present disclosure.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers in the figures refer to like elements throughout. Hence, if a feature is used across several drawings, the number used to identify the feature in the drawing where the feature first appeared will be used in later drawings.

DETAILED DESCRIPTION

Techniques described herein relate to systems and methods for programmatically updating the status of assets tracked in a supply chain environment, according to at least one embodiment of the present disclosure.

In the context of supply chain management, there are many challenges involved in the successful delivery of assets. The ability to track and update the status of assets is desirable and/or imperative in many scenarios. There are many challenges involved in the implementation of automated status tracking of assets in a supply chain context—for example, the reliance on manual or human intervention is often prone to human error, is unreliable, and slow. These shortcomings can negatively impact the ability of individuals and organizations to properly utilize available resources. For example, such may be the case for manufacturing, where having accurate and up-to-date information on the status of a manufacturing component as being consumed or available in a manufacturing facility or other care facility can provide critical information that is used to determine whether a manufacturing step can be performed, how to allocate or re-allocate the distribution of scarce manufacturing supplies, and more.

Accordingly, there is a present need for improved systems and methods for tracking and updating the status of assets tracked in a supply chain environment.

In various embodiments, the number of manual or human touch points required for assets to flow through a supply chain environment are reduced. Computer-based systems—such as cloud-based service providers—may be used to detect when the status of an asset being tracked in a supply chain environment changes. This may be performed in an automated and streamlined manner that does not require manual intervention by customers. For example, techniques described herein may be used to programmatically detect when a tracking device is paired to an asset and/or when a tracking device is un-paired from an asset. This is merely one example of a classification of a piece of hardware that can be done programmatically and without manual intervention. For example, rather than having a manual process in which a tracking device's serial number is physically scanned to link it to an asset, the pairing process may be performed programmatically based on environmental data that is passively being collected by the tracking device. Likewise, the manual step of unpairing a tracking device from an asset (e.g., upon delivery of the asset) may also be automatically determined using environmental data that is passively collected by tracking devices, removing the need of human interaction to unpair a sensor from an asset.

In various embodiments, the status of an asset is encoded as a set of states, for example, as a finite state machine. In various embodiments, the possible states and state transitions of the finite state machine are determined using machine learning from historical asset tracking data that is collected for different types of use cases. Environmental data collected by sensors may include, for example, geolocation data (GPS coordinates), temperature data, time data, proximity data, and so forth. Embodiments of the present disclosure relate to the use of different types of environmental data to determine state information regarding the status of an asset.

For example, conventional means for determining whether an asset has been delivered typically utilize GPS receivers and other geolocation-based data to determine whether the asset is within a geofence associated with the delivery destination. In contrast, techniques described herein may utilize other types of environmental sensor data, such as temperature data, to determine when an asset has been delivered. There are cases where geolocation data is inaccurate—for example, in cases where the delivery location is indoors or in other environments where there is larger amounts of geolocation error. For example, the presence of multipath errors or selective availability (SA) may cause a greater degree of uncertainty or error in the determination of the location of an asset or tracking device and may therefore cause erroneous determinations as to the exact location of the asset or tracking device. For example, GPS and geolocation-based systems may perform poorly when determining whether an asset was dropped off outside of a building as opposed to inside the building, as the fidelity of GPS-based systems can introduce errors of up to several meters. These challenges can make the status of an asset more difficult to determine based solely on conventional means.

In various embodiments described herein, the status of an asset is tracked based on one or more types of environmental sensor data and a system is configured to determine a state classification for a tracked asset. Then, recommendations, notifications, categorizations, or other types of downstream actions may be taken based on the determination. As an example, temperature sensors may be used to continuously collect temperature data for an asset while it is in transit. The asset may, for example, be a temperature-sensitive asset that is transported in a truck under refrigerated conditions. The tracking device may be physically attached to the asset or a box or other housing for the asset. Upon arrival at a destination, the asset may be unloaded and the tracking device may be physically detached from the asset. The tracking device may be returned to the shipper and may be reused for tracking the shipment of other assets. In various embodiments, the status of the tracking device may be determined based on temperature data. For example, when the tracking device is in a cold temperature environment, it may be inferred that the asset is still in transit, but a sudden and prolonged increase in temperature may indicate that the asset has been delivered, and that the status of the tracking device may be considered as "unpaired" and may be allocated or reserved for subsequent use. In various embodiments, the logical classification or inference is made further based on geolocation data—for example, the asset being located within the geofence. The additional signals may be used to develop greater confidence that the increase in temperature is due to the delivery of the asset and not due to a failure in a refrigeration unit, for example.

It should be noted that techniques performed "by" or "based on" are to be construed or may be synonymous to "by at least" or "based at least in part on" rather than "by solely" or "based solely on", unless it is explicitly stated or clear from the context. For example, a system that implements specific features "by" performing a particular step may be described in a manner that is not exclusive of the performance of other steps, some of which may be related to said particular step. In some cases, other steps may be omitted from various discussions for the sake of clarity.

Accordingly, sensor data obtained from tracking devices may be collected and used to determine the status of a tracked asset that would not otherwise be directly or intuitively associated with the status—for example, location-related status information may be inferred based on temperature data. This type of environmental sensor data may be used to indirectly determine or infer the status of a tracked asset, and may be used in addition or in combination with direct means of measuring status. In various embodiments, the status of tracked assets in a supply chain context are automatically updated in response to inferences determined based on environmental sensor data. For example, a tracking device may be programmatically linked to and/or unlinked from an asset without requiring any manual intervention, according to at least one embodiment of the present disclosure.

An illustrative, non-limiting example of how the status of tracked assets is programmatically updated is described herein. In at least one embodiment, a tracking device is attached to an asset. When a tracking device is linked to an asset, a database record may reflect the status of the tracking device as being linked to a uniquely identifiable asset. The status of a device may be programmatically updated based on changes in signal data. For example, a tracking device may be attached to an asset such as a manufacturing component or supplies that are stored in a specific environment. For example, the asset may be stored in a metal locker with an emitter device that emits short range radio frequency (RF) or infrared (IR) wireless signals. An asset may exhibit markedly different behavior inside the locker as opposed to outside. For example, an IR signal detected by a tracker on the asset may be very strong inside the locker but significantly weaker outside. Accordingly, in various embodiments, RF signal strength may be used to infer the status of the asset—high RF signals may be used to infer that the item is within a locker whereas low RF signal strengths may indicate that the asset was removed from the locker but still in the same room or proximity, and zero or near-zero RF signal strength may indicate that the asset was removed from the room or proximity. As an example, a tracking device may be attached to a controlled substance such as a controlled drug and when such assets are not in use they may be stored in a cabinet that is locked or otherwise restricted. In various embodiments, an intelligence engine utilizes a set of environmental sensor data to determine the status of an asset (e.g., checked in or checked out) based on various factors such as RF signal strength or temperature data, time data, and so forth. The asset may be determined to be in use or checked out for use when the tracking device is on such an asset.

In various embodiments, sensor data is used to make decisions or classifications regarding the state of an asset. Different types of environment sensor data may be used to indirectly inference the status of an asset, and may be used in place of or to augment other types of sensor data that may be used more typically in such status determinations. For example, when tracking the physical location of an asset, GPS or other geolocation data may be considered conventional or direct means for determining when an asset has reached a location, which may be geofenced. A GPS receive may be utilized to collect latitude and longitude coordinates of an asset to determine whether it is in a geofence. In some embodiments, temperature data may be used as a secondary source of environmental sensor data to verify or provide assurances of the status. Accordingly, sensor data collected by tracking devices may be used to make indirect classifications and determine asset status in a manner that is unconventional and not how they are traditionally used.

In various embodiments, the status of an asset is classified based on environmental sensor data and the determined status is recorded to a database. The updating of an asset or tracking device's status may be used to drive the behavior of downstream systems, such as inventory system and may cause the assets to be displayed differently based on changes in status. For example, when a tracking device is paired to an asset, it may be displayed on a graphical interface that shows the location and condition of various assets as they are making their way through a supply chain. Conversely, if it is determined (e.g., using environmental sensor data) that the tracking device has been unlinked from an asset, then the graphical interface may be updated to remove that tracking device and/or asset from the map and to show the tracking device as being available for pairing with other assets and may be accordingly allocated for subsequent use.

Environmental sensor data may be used to determine the status of a tracked asset based on contextual information. For example, different types of assets may have different expected workflows. The workflows may be represented by different states that can be modeled as a finite state machine. As an illustrative example, in the context of a manufacturing component such as a protective coating, when it is taken to a workstation, it may be assumed that the asset has been opened or consumed. The asset may be considered used when it has been taken to the workstation, and it can therefore be assumed that a tracking device associated with such an asset can be unlinked to no longer track the device since it has been consumed or used. In this case, the device may be either used/consumed or subject to its own reverse logistics flow that may be tracked separately. In either case, the tracking device may be unlinked from the asset.

In various embodiments, there is an expected flow of an asset, such as different locations or organizations that it is expected to go through. For a manufacturing component, it may be shipped from a seller to a manufacturing facility, received by the manufacturing facility, stored, taken to a workstation for use, and then used.

FIG. 1 illustrates an example environment 100 in which techniques for programmatically updating the status of assets tracked in a supply chain environment may be implemented, in accordance with one or more embodiments of the present disclosure. The left-portion and right-portion of FIG. 1 illustrate an example embodiment in which environmental sensor data (e.g., temperature data) may be used to determine the status of an asset has changed from a first time t1 (left-portion) and a right time t2 (right-portion). One or more machines and/or systems described in connection with FIG. 1, including intelligence engines, data ingestion engines, and more, may be implemented in the context of FIG. 8.

Package 102 may refer to any suitable physical asset that may be transported through a supply chain. Package 102 may include various types of goods. Package 102 may include electronics, food, medical supplies, and so forth. Package 102 may be transported across great physical distances—for example, from a manufacturing facility to an end user. While in transportation, in storage, etc., the package 102 may be subject to various environmental events or conditions that may result in the package being damaged, lost, or otherwise rendered unsatisfactory for its intended use. In some cases, a single tracking device may be used to track multiple packages. In some cases, a single package is monitored using multiple tracking devices.

An attached tracking device 104 may be an Internet-of-Things (IoT) embedded device that includes various sensors to collect metrics about the package while it is in transit. Examples of sensors may include GPS receivers; temperature sensors; light sensor, pressure sensor, moisture sensor, shock and impact sensors; clocks, and more. The tracking device may collect metrics at regular intervals specified by an authorized user and transmit the collected metrics to the organization's computer network. These metrics may be used to determine the status of assets using environmental data. The tracking device may be attached to package 102 in any suitable manner. The attached tracking device may be adhered to the side of the package 102, included inside the package 102, and so on.

Warehouse 106 may refer to a destination or delivery location for package 102. In various embodiments, the delivery of an asset to a facility is a state change which should be promptly updated and allow for downstream processes to be initiated. While a warehouse 106 is depicted in FIG. 1, any other suitable destination, such as a manufacturing facility or office building is also an acceptable destination within the scope of this disclosure. A state change or asset status may be updated when the asset is received by an employee or other worker of the facility.

Map 108 depicts a shortcoming of using conventional means to determine that the asset has been delivered and received. Conventional means for determining whether an asset has been delivered typically utilize GPS receivers and other geolocation-based data to determine whether the asset is within a geofence associated with the delivery destination. There are cases where geolocation data is inaccurate or includes tracking error which may be impossible or impractical to mitigate—for example, in cases where the delivery location is indoors or in other environments where there is larger amounts of geolocation error. For example, the presence of multi-path errors or selective availability (SA) may cause a greater degree of uncertainty or error in the determination of the location of an asset or tracking device, and may therefore cause erroneous determinations as to the exact location of the asset or tracking device. For example, GPS and geolocation-based systems may perform poorly when determining whether an asset was dropped off outside of a building as opposed to inside the building, as the fidelity of GPS-based systems can introduce errors of up to several meters. These challenges can make the status of an asset more difficult to determine based solely on conventional means. As depicted in FIG. 1, it may be difficult to determine based on GPS coordinates whether the package 102 was received at time t1 (left-portion of FIG. 1) as compared to time t2 (right-portion of FIG. 1). For example, both GPS coordinates 110A from t1 and GPS coordinates 110B from t2 are both subject to some degree of tracking error, which results in an approximate location that could be both inside and outside of warehouse 106. Additionally, tracking error may increase when package 102 is actually taken into an indoor facility, especially if it is taken underground or into an environment where GPS signals are subject to greater amounts of loss.

In contrast, techniques described herein may utilize other types of environmental sensor data, such as temperature data, to determine when an asset has been delivered. As depicted in FIG. 1, sensor data 112A such as temperature data is continuously collected. The temperature of the package may be steady and at a high relative temperature due to being outdoors in a hot climate. At time t2, a worker at warehouse 106 receives package 102 and takes it into the warehouse, which is considerably cooler than the outdoor temperature. As a result, the sensor data 112B collected between time t1 and time t2 show a sharp drop in temperature that levels off and remains at the lower temperature. In various embodiments, an intelligence engine utilizes the environmental sensor data to determine, either in conjunction with or in place of geolocation data, whether the asset was delivered.

While an illustrative example is depicted in FIG. 1, the discussion of a specific use case should not be construed to be limiting as to the scope of the disclosure, and other use cases are also contemplated as being within the scope of this disclosure.

Figure 2:
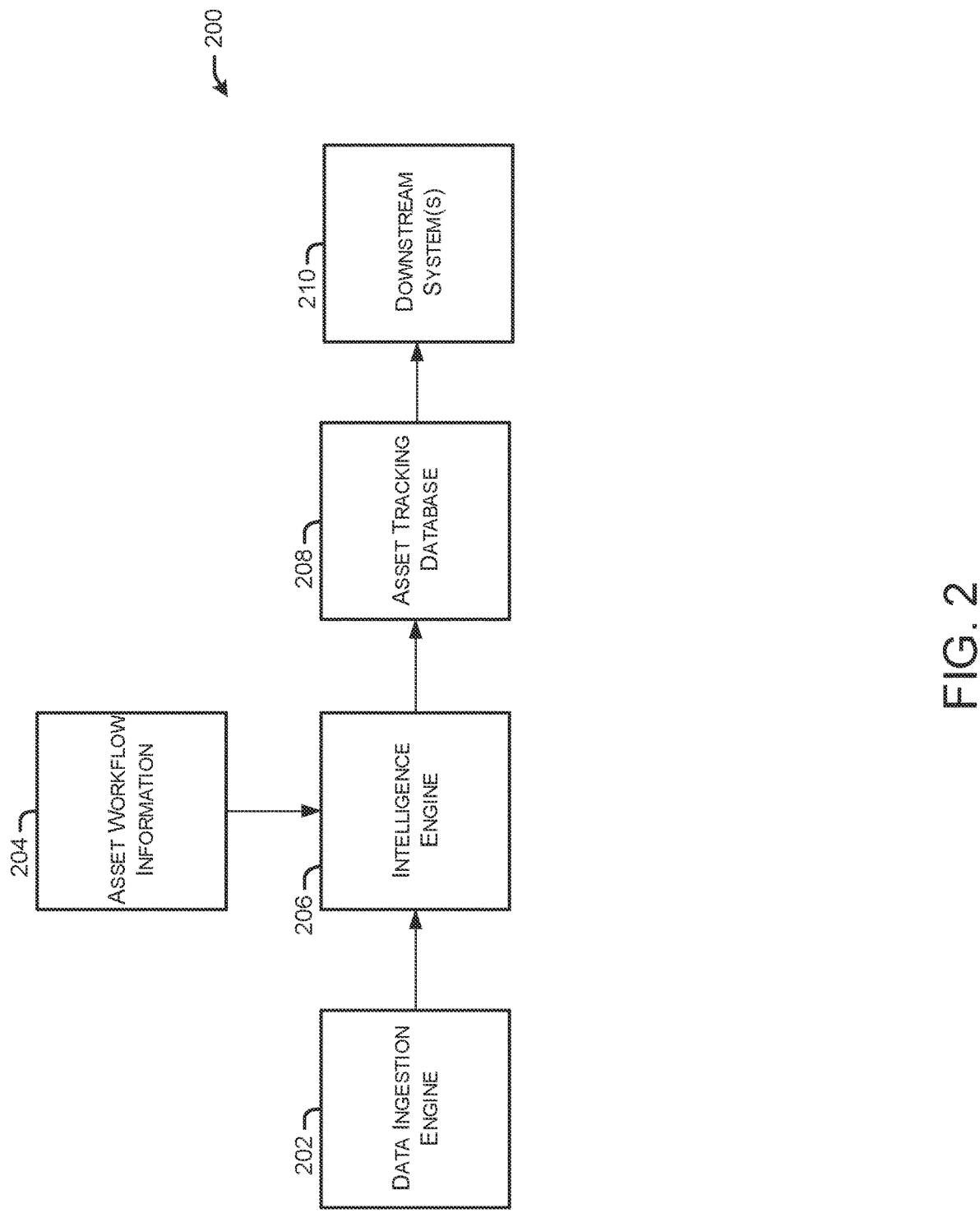
FIG. 2 illustrates an example environment depicting a computer-based architecture for determining the status of tracked assets, in accordance with one or more embodiments of the present disclosure.

FIG. 2 illustrates an example environment 200 depicting a computer-based architecture for determining the status of tracked assets, in accordance with one or more embodiments of the present disclosure. One or more machines and/or systems described in connection with FIG. 2, including data ingestion engines, intelligence engines, asset tracking databases, downstream systems, and more, may be implemented in the context of FIG. 8.

Data ingestion engine 202 may refer to hardware, software, or a combination thereof that collects data that is used by downstream components. Data ingestion engine 202 may be responsible for storing and providing access to environmental tracking data for assets as they move through a supply chain environment. In some embodiments, data ingestion engine 202 is implemented using a database system to store environmental tracking data. Tracking data may include various information about a package collected from on-board sensors, such as GPS receivers; temperature sensors; light sensor, pressure sensor, moisture sensor, shock and impact sensors; clocks, and more. In some embodiments, data ingestion engine is also responsible for accessing and storing external data. External data may refer to data external from the sensors on a tracking device. This information may include information about the environment of the supply chain, such as weather data, traffic data, presence data, and so on and so forth. Data collected by data ingestion engine may be used by one or more downstream components of a supply chain management system, such as a system implemented in the context of environment 200. In various embodiments, data ingestion engine 202 collects external data in addition to the tracking data from portable tracking devices. External data may refer to data that is collected from sources other than sensors of the tracking device. The ingestion engine 204 may also collect asset data, also referred to herein as asset metadata that may identify or describe features of the asset, as well as shipping, storage or use parameters. For example, metadata may include an asset name, model, manufacturer, volume, size, delivery data, delivery location, responsible party, technical designations, delivery parameters (e.g., temperature, transit time, etc.), expiration date, etc.

The ingestion engine 204 may also collect include direct. For instance, direct sensor data may refer to information that may be considered ground truth data, determinative of a status, such as when an asset is manually verified such as by visual inspection or scanning a machine readable code associated with the asset that is generally determinative that asset is at a location, such as a warehouse. In contrast, indirect sensor data, such as the environmental sensor data discussed herein, is not determinative of a status (e.g., location), but is used to infer or predict in a non-intuitive manner a status or status change of an asset.

In various embodiments, asset workflow information 204 refers to a data structure or other suitable format for encoding an expected flow for an asset, or a portion thereof. For example, an expected flow for an asset may be that it is transported from a warehouse to a facility such as an office where it is received and stored. As another example, a manufacturing component may be an asset that is received by a manufacturing facility, stored in a cabinet, removed from the cabinet, transported to a workstation, and then consumed or returned for reverse logistics.

In various embodiments, the status of an asset is encoded as asset workflow information 204. In some embodiments, asset workflow information 204 is generated through user inputs or through a machine learning process. For example, asset workflow information 204 may be represented as a finite state machine with various states—unopened/unused, transported to a workstation, used/consumed, returned to locker, etc. In various embodiments, the possible states and state transitions of the finite state machine are determined using machine learning from historical asset tracking data that is collected for different types of use cases. Environmental data collected by sensors may include, for example, geolocation data (GPS coordinates), temperature data, time data, proximity data, and so forth. Embodiments of the present disclosure relate to the use of different types of environmental data to determine state information regarding the status of an asset.

Intelligence engine 206 may be used to process data from data ingestion engine 202 (e.g., environmental sensor data), asset workflow information 204 for a particular asset or supply chain workflow, and determine a status of the asset. In various embodiments, the asset metadata may be use in the determination of the appropriate/corresponding asset workflow of a given asset or group of assets. The status may correspond to a state within a finite state machine. In some embodiments, changes in environment sensor data readings of one or more types of environmental sensor data may indicate a status change of an asset. In various embodiments, consistent readings over a period of time may indicate a status change of an asset. In various embodiments, a combination of different types of environmental sensor data may indicate a change in status. For example, GPS and geolocation-based systems may perform poorly when determining whether an asset was dropped off outside of a building as opposed to inside the building, as the fidelity of GPS-based systems can introduce errors of up to several meters. These challenges can make the status of an asset more difficult to determine based solely on conventional means.

In various embodiments described herein, the status of an asset is tracked based on one or more types of environmental sensor data collected by data ingestion engine 202 and intelligence engine 206 is configured to determine a state classification for a tracked asset. The possible states may be defined by asset workflow information 204. Then, recommendations, notifications, categorizations, or other types of downstream actions may be taken based on the determination. As an example, temperature sensors may be used to continuously collect temperature data for an asset while it is in transit. The asset may, for example, be a temperature-sensitive asset that is transported in a truck under refrigerated conditions. The tracking device may be physically attached to the asset or a box or other housing for the asset. Upon arrival at a destination, the asset may be unloaded and the tracking device may be physically detached from the asset. The tracking device may be returned to the shipper and may be reused for tracking the shipment of other assets. In various embodiments, the status of the tracking device may be determined based on temperature data. For example, when the tracking device is in a cold temperature environment, it may be inferred that the asset is still in transit, but a sudden and prolonged increase in temperature may indicate that the asset has been delivered, and that the status of the tracking device may be considered as "unpaired" and may be allocated or reserved for subsequent use. In various embodiments, the logical classification or inference is made further based on geolocation data—for example, the asset being located within the geofence. The additional signals may be used to develop greater confidence that the increase in temperature is due to the delivery of the asset and not due to a failure in a refrigeration unit, for example.

Accordingly, sensor data obtained from tracking devices may be collected by data ingestion engine 202. Asset workflow information 204 may be determined for a specific asset and/or specific flow that the asset is going through. Intelligence engine 206 may determine the status of a tracked asset that would not otherwise be directly or intuitively associated with the status—for example, location-related status information may be inferred based on temperature data. This type of environmental sensor data may be used to indirectly determine or infer the status of a tracked asset, and may be used in addition or in combination with direct means of measuring status. In various embodiments, the status of tracked assets in a supply chain context are automatically updated in an asset tracking database 208 in response to inferences determined based on environmental sensor data. For example, a tracking device may be programmatically linked to and/or unlinked from an asset without requiring any manual intervention, according to at least one embodiment of the present disclosure. In various embodiments, the same or separate database is used to track the status of tracking devices, for example, as being paired or unpaired, and various other information regarding the tracking devices may be recorded to provide for more granular status information relating to the state of a tracking device.

In various embodiments, updates to asset tracking database 208 may be used to trigger to performance of downstream steps. For example, one or more downstream systems such as downstream system(s) 210 depicted in FIG. 2 may receive notifications or events from suitable event notification mechanism. Examples of downstream systems may include for example, manufacturing inventory system that are used to determine the inventory levels of different types of components. For example, when applying several layers of a protective chemical coating, there may be multiple containers of the coating used that are taken to a workstation but not all are used. In such a scenario, it may be the case that two of the containers will be marked as being consumed and the other two may be returned to the inventory of available materials. In some cases, however, the other open coating containers may be marked as partially used and may be subject to a reverse logistics flow that is initiated based on updates to records in asset tracking database 208.

Figure 3:
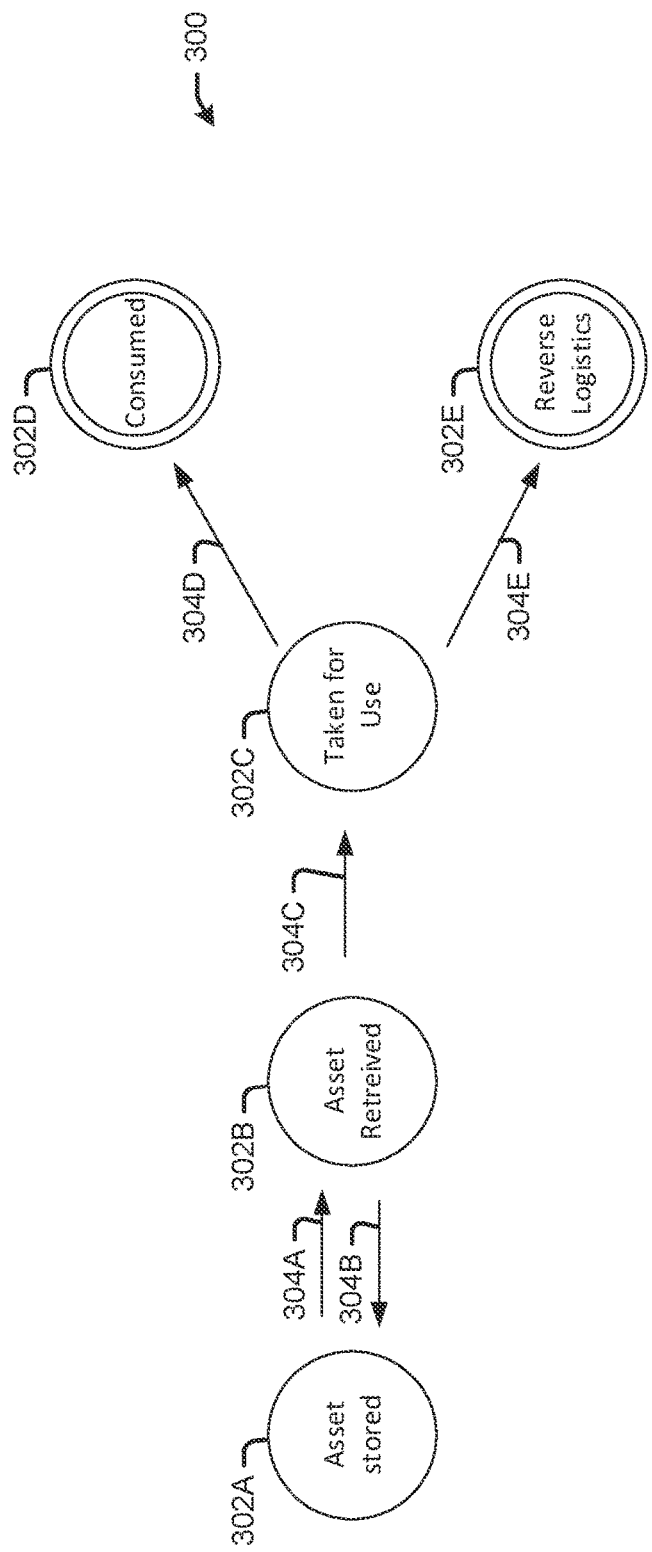
FIG. 3 illustrates a diagram depicting an example representation of asset workflow information, in accordance with one or more embodiments of the present disclosure.

FIG. 3 illustrates a diagram 300 depicting an example representation of asset workflow information, in accordance with one or more embodiments of the present disclosure.

In at least one embodiment, diagram 300 depicts asset workflow information, which may be utilized in the context of FIG. 2 and other embodiments described elsewhere in this disclosure. Diagram 300 depicts a finite state machine, according to at least one embodiment, which can be generated by machine learning or hand crafted, but in either case defines a set of states and possible transitions that an asset and/or tracker should be following. In various embodiments, several workflows exist and the appropriate workflow(s) for an asset are selected based on the supply chain workflow that is being performed.

FIG. 3 depicts a non-limiting, illustrative finite state machine comprising nodes 302A-302E and directed edges 304A-304E, according to at least one embodiment. The different states may correspond to different stages of a supply chain. For example, diagram 300 may follow the different stages for the use of consumable asset in the context of a manufacturing facility. This may be determined based on a tracked asset being within a geofence, tracking temperature readings and expected temperature changes based on location (e.g., inside or outside a facility). In various embodiments, wireless signal emitters (e.g., RF signals) within a facility may be used to determine whether the asset was received.

Continuing with this example, state 302A may refer to the asset being stored or otherwise inventoried by the manufacturing facility. For example, the tracked asset may be a temperature-sensitive chemical that is stored within a freezer or a component that is stored within a storage room or metal locker for safe keeping. A tracked asset may be stored inside a metal locker that has said emitter located inside. The RF signal strength may be used to determine whether a tracked asset is stored inside the locker, is outside of the locker but still in the same room, or taken away from the room. Other emitters may be located throughout a manufacturing facility to determine which part of the facility the tracked asset is in, which work station the tracked asset is at, and so forth. For example, a volatile chemical or valuable raw material can be tracked in such a manner to determine when it is utilized and where it is being used.

Environmental sensor data may be used to determine when a state transition from state 302A to state 302B occurs, which is depicted as a directed edge 304A. For example, an intelligence engine may determine when a transition from state 302A to 302B occurs when a RF signal or signature is detected by a tracking device with high intensity changes to a lower intensity. The lower intensity signal strength may indicate that the manufacturing component was retrieved or taken out of the metal storage locker, and is represented by state 302B according to at least one embodiment. The signal strength may be used to determine various states. For example, a high signal strength may correspond to the tracked asset being stored inside a specific locker (or alternatively, a room, cabinet, or the like) whereas a drop of 20-30 dB may correspond to the asset being taken out of the locker but still within proximity to the locker, and even greater drops in signal strength may correspond to the tracked asset no longer being in proximity to the locker and that other types of environmental sensor data may be needed to ascertain the status of the tracked asset.

State 302C may refer to another state of a finite state machine. For example, if the tracked asset is a consumable asset that is in a stored state, such as in a supply room or cabinet, and may be taken to a different location, such as an assembly station in a manufacturing facility where it may be either consumed or use in manufacturing process (e.g., state 302D) or returned for reverse logistics (e.g., state 302E). State 302D and state 302E may represent end state of a workflow, as represented by the double circles. At state 302D, at or about the time of consumption or use, the tracking device that generates the sensor data may be automatically unpaired from the asset for reuse with another asset, avoiding the need for human interaction for manually unpairing. In various embodiments, a state transition represented by directed edge 304C may be indicated by emitters throughout a facility being used to determine that the tracked asset was taking out of a storage room or cabinet (e.g., as indicated by a decrease in RF signal strength) and then taken to another room or other part of the facility based on emitter signals detected throughout the facility that may present different signals or signal patterns.

In various embodiments, a state transition represented by directed edge 304B represents that a transition back to state 302B is possible. For example, in some embodiments, the consumable asset can be taken out of a storage area and then placed back into the storage area. In some embodiments, the fact that the asset is detected at a workstation may be indicative that it has been "opened" and needs to be replaced or subject to a reverse logistics flow even if it is not consumed.

Sensor data is collected by tracking devices in real time to infer whether a state transition has happened or not. In various embodiments, the state transition is a result of a change in sensor data readings, for example, a pronounced increase or drop in temperature. In some embodiments, the state transition is due to the item being stationary for a long time, like at a workstation for a prolonged period of time (e.g., indicating that it may have been selected for use in a manufacturing step). Once the asset flow information and the sensor data are known, the sensor data may be analyzed by an intelligence engine to determine the present state of a tracked asset and when a state transition occurs. In various embodiments, there can be one or more end states for the tracked asset. Example end states may include delinking the asset because it's consumed, spoiled, returned, etc. Transitions can be detected via the very regular expected flow of the asset through a supply chain, such as being placed on a truck and is moving, and also they can be done via proximity or geofencing.

Figure 4:
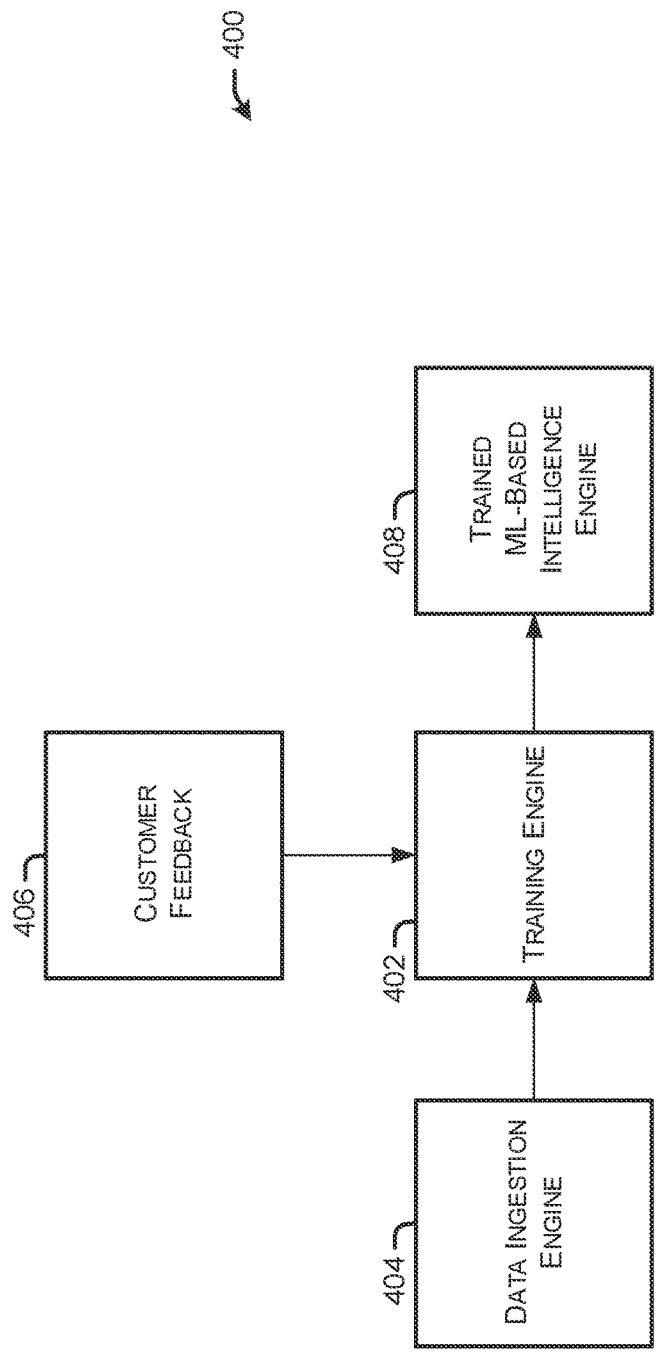
FIG. 4 illustrates an example environment depicting a first training technique for generating a machine learning (ML)-based intelligence engine for determining the status of tracked assets, in accordance with one or more embodiments of the present disclosure.

FIG. 4 illustrates an example environment 400 depicting a first training technique for generating a machine-learning (ML)-based intelligence engine for determining the status of tracked assets, in accordance with one or more embodiments of the present disclosure.

In various embodiments, training engine 402 refers to hardware and/or software that is configured to train an intelligence engine. For example, environmental sensor data collected from data ingestion engine 404 and customer feedback 406 provided in response to prompts may be used to refine and/or determine trained ML-based intelligence engine 408. In various embodiments, a ML-based intelligence engine is trained or retrained (e.g., using additional training data) using training engine 402 and on historical sensor data, such as environmental sensor data that was previously collected from various assets, tracking devices, and usages thereof.

Data ingestion engine 404 may refer to hardware, software, or a combination thereof that collects data that is used by downstream components. Data ingestion engine 404 may be implemented in the context of FIG. 2 and may be responsible for storing and providing access to tracking data for assets as they move through a supply chain environment. In some embodiments, data ingestion engine 404 is implemented using a database system to store tracking data. Tracking data may include various information about a package collected from on-board sensors, such as GPS receivers; temperature sensors; light sensor, pressure sensor, moisture sensor, shock and impact sensors; clocks, and more. In some embodiments, data ingestion engine is also responsible for accessing and storing external data. External data may refer to data external from the sensors on a tracking device. This information may include information about the environment of the supply chain, such as weather data, traffic data, presence data, and so on and so forth. Data collected by data ingestion engine may be used by one or more downstream components of a supply chain management system, such as a system implemented in the context of environment 400. In various embodiments, data ingestion engine 404 collects external data in addition to the tracking data from portable tracking devices.

In various embodiments, an intelligence engine (e.g., one that is being trained) is used to monitor sensor data collected by data ingestion engine 404 and inferences when a state transition occurs. When the ML-based intelligence engine inferences that a state transition occurred, a notification may be sent to a customer via any suitable mechanism, such as a text message, e-mail, mobile application notification, or smart communications platform. In various embodiments, the user receives the notification of a putative state transition and is able to provide customer feedback 406 that indicates whether the inference was correct or incorrect. In this way, the customer feedback 406 may be viewed as ground truth annotations that can be used to train an artificial intelligence (AI) or machine learning (ML) model on historical sensor data.

Figure 5:
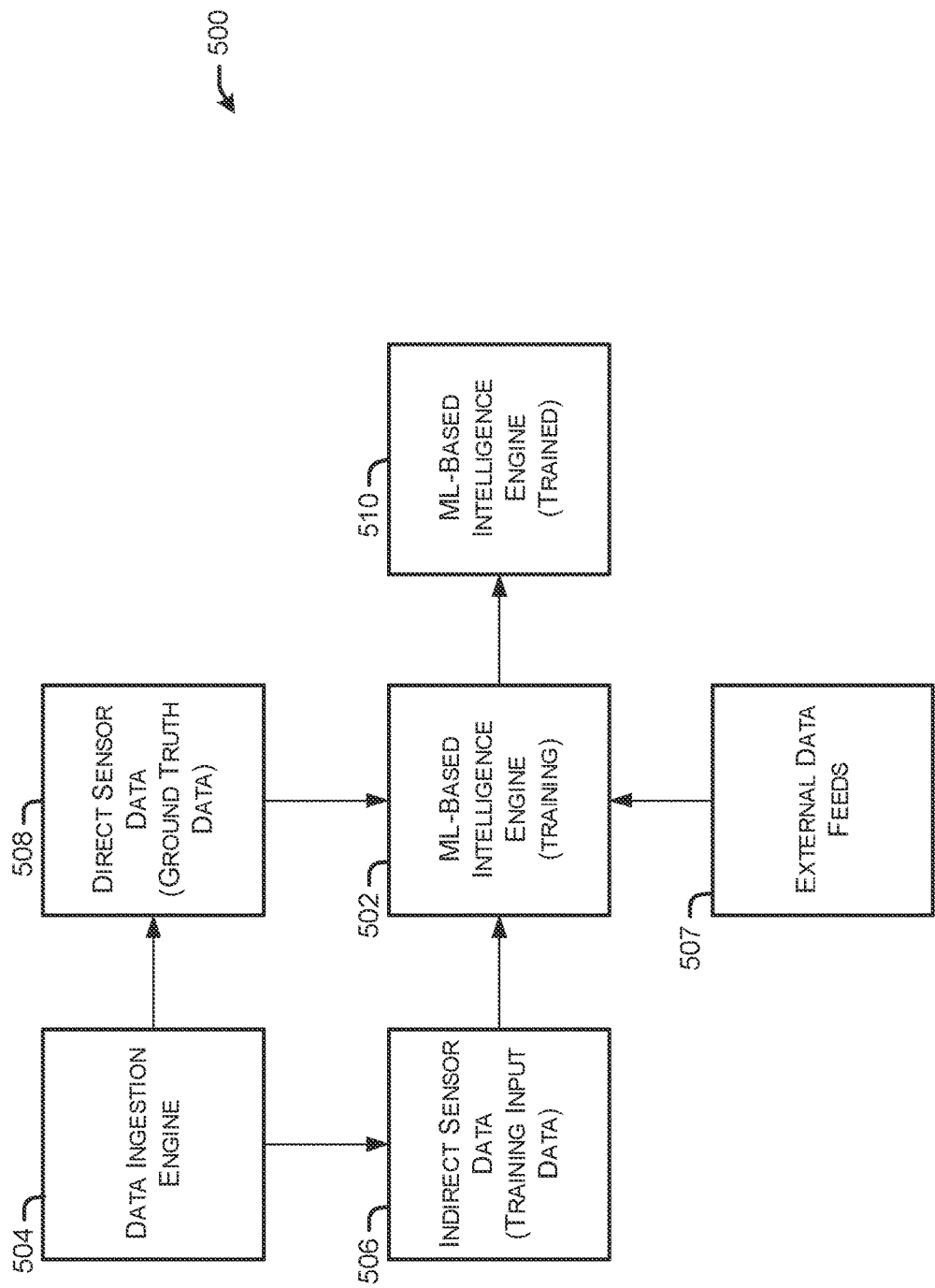
FIG. 5 illustrates an example environment depicting a second training technique for generating a machine learning (ML)-based intelligence engine for determining the status of tracked assets, in accordance with one or more embodiments of the present disclosure.

FIG. 5 illustrates an example environment 500 depicting a second training technique for generating a machine learning (ML)-based intelligence engine for determining the status of tracked assets, in accordance with one or more embodiments of the present disclosure.

In various embodiments, the ML-based intelligence engine, also referred to as the training engine, 502 refers to hardware and/or software that is configured to train an intelligence engine. For example, environmental sensor data collected from data ingestion engine 504 may be used to refine and/or determine trained ML-based intelligence engine 510. In various embodiments, a ML-based intelligence engine is trained or re-trained (e.g., using additional training data) using training engine 502 on historical sensor data.

Data ingestion engine 504 may refer to hardware, software, or a combination thereof that collects data that is used by downstream components. Data ingestion engine 504 may be implemented in the context of FIG. 2 and may be responsible for storing and providing access to tracking data for assets as they move through a supply chain environment. In some embodiments, data ingestion engine 504 is implemented using a database system to store tracking data. Tracking data may include various information about a package collected from on-board sensors, such as GPS receivers; temperature sensors; light sensor, pressure sensor, moisture sensor, shock and impact sensors; clocks, and more.

In some embodiments, data ingestion engine is also responsible for accessing and storing external data. External data may refer to data external from the sensors on a tracking device. This information may include information about the environment of the supply chain, such as weather data, traffic data, presence data, and so on and so forth. Data collected by data ingestion engine may be used by one or more downstream components of a supply chain management system, such as a system implemented in the context of environment 400. In various embodiments, data ingestion engine 504 collects external data in addition to the tracking data from portable tracking devices. In some embodiments, external data feed 507 may be collect and send external data to the training engine 502. This information may include information about the environment of the supply chain, such as weather data, traffic data, presence data, and so on and so forth. Data collected by external data feed 507 may be used by one or more downstream components of a supply chain management system, such as a system implemented in the context of environment 400. In various embodiments, an intelligence engine (e.g., one that is being trained on historical sensor data) is used to monitor sensor data collected by data ingestion engine 504 and inferences when a state transition occurs. In some embodiments, sensor data collected by data ingestion engine is divided into two non-overlapping data sets—indirect sensor data 506 that is used as training input data and direct sensor data 508 that is used as ground truth data or labels.

For example, consider embodiments described in connection with FIG. 1 in which temperature data is used to determine when an asset is received in a warehouse. In this illustrative, non-limiting use case, indirect sensor data 506 may include temperature data or other environmental sensor data that is collected that may be used to indirectly determine the location of the asset. Conversely, direct sensor data 508 may refer to information such as when the asset was manually scanned as being received at the warehouse. It should be noted that this manual scanning step, that generates manual verification data, may be performed during the training of the intelligence engine, but may be eliminated or considered redundant once the intelligence engine has been trained to a level of accuracy that is acceptable. Direct sensor data 508 may be withheld from the training input data and instead used as ground truth data to train and refine the ML-based model.

An illustrative, non-limiting example of how the status of tracked assets is programmatically updated is described herein. In at least one embodiment, a tracking device is attached to an asset. When a tracking device is linked to an asset, a database may reflect the status of the tracking device as being linked to a uniquely identifiable asset. The status of a device may be programmatically updated based on changes in signal data. For example, a tracking device may be attached to an asset such as a manufacturing component or supplies that are stored in a specific environment. For example, the asset may be stored in a metal locker with an emitter device that emits short range radio frequency (RF) or infrared (IR) wireless signals. An asset may exhibit markedly different behavior inside the locker as opposed to outside. For example, an IR signal detected by a tracker on the asset may be very strong inside the locker but significantly weaker outside. Accordingly, in various embodiments, RF signal strength may be used to infer the status of the asset—high RF signals may be used to infer that the item is within a locker whereas low RF signal strengths may indicate that the asset was removed from the locker but still in the same room or proximity, and zero or near-zero RF signal strength may indicate that the asset was removed from the room or proximity. As an example, a tracking device may be attached to a controlled substance such as a controlled drug and when such assets are not in use they may be stored in a cabinet that is locked or otherwise restricted. In various embodiments, an intelligence engine utilizes a set of environmental sensor data to determine the status of an asset (e.g., checked in or checked out) based on various factors such as RF signal strength or temperature data, time data, and so forth. The asset may be determined to be in use or checked out for use when the tracking device is on such an asset.

In various embodiments, sensor data is used to make decisions or classifications regarding the state of an asset. Different types of environment sensor data may be used by intelligence engine to indirectly inference the status of an asset, and may be used in place of or to augment other types of sensor data that may be used more typically in such status determinations. For example, when tracking the physical location of an asset, GPS or other geolocation data may be considered conventional or direct means for determining when an asset has reached a location, which may be geofenced. A GPS receive may be utilized to collect latitude and longitude coordinates of an asset to determine whether it is in a geofence. In some embodiments, temperature data may be used as a secondary source of environmental sensor data to verify or provide assurances of the status. Accordingly, sensor data collected by tracking devices may be used to make indirect classifications and determine asset status in a manner that is unconventional and not how they are traditionally used.

In various embodiments, the status of an asset is classified based on environmental sensor data and the determined status is recorded to a database. The updating of an asset or tracking device's status may be used to drive the behavior of downstream systems, such as inventory system and may cause the assets to be displayed differently based on changes in status. For example, when a tracking device is paired to an asset, it may be displayed on a graphical interface that shows the location and condition of various assets as they are making their way through a supply chain. Conversely, if it is determined (e.g., using environmental sensor data) that the tracking device has been unlinked from an asset, then the graphical interface may be updated to remove that tracking device and/or asset from the map and to show the tracking device as being available for pairing with other assets and may be accordingly allocated for subsequent use.

Environmental sensor data may be used to determine the status of a tracked asset based on contextual information. For example, different types of assets may have different expected workflows. The workflows may be represented by different states that can be modeled as a finite state machine. As an illustrative example, in the context of a manufacturing component such as a protective coating, when it is taken to a workstation, it may be assumed that the asset has been opened or consumed. The asset may be considered consumed when it has been taken to the workstation, and it can therefore be assumed that a tracking device associated with such an asset can be unlinked to no longer track the device since it has been consumed or used. In this case, the component may be either used or subject to its own reverse logistics flow that may be tracked separately. In either case, the tracking device may be unlinked from the asset.

Figure 6:
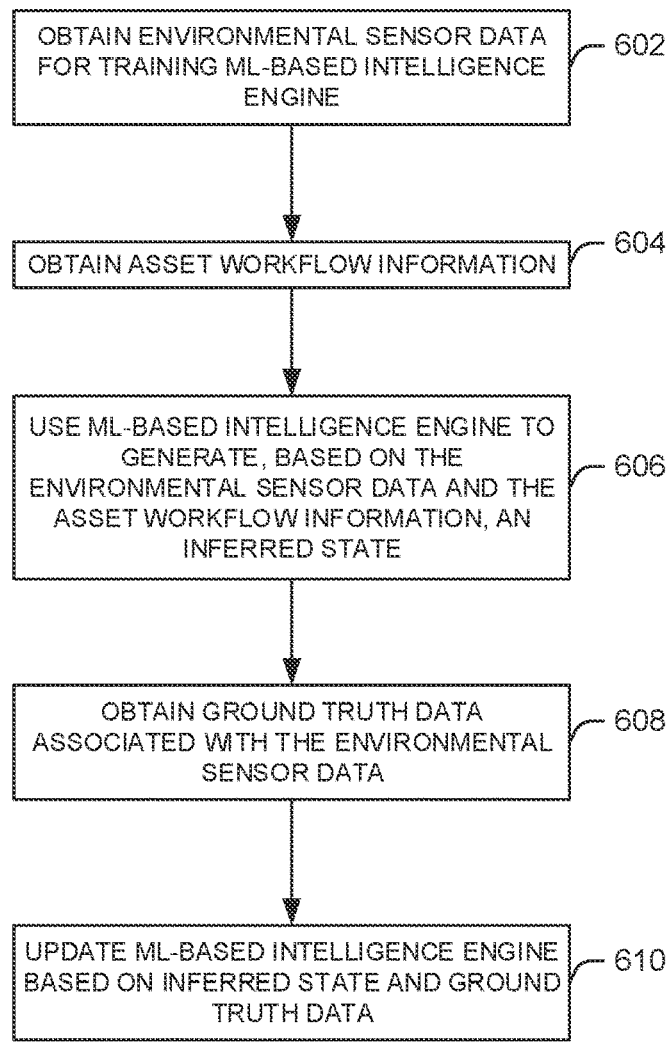
FIG. 6 shows an illustrative example of a process for training a machine learning (ML)-based intelligence engine for determining the status of tracked assets, in accordance with one or more example embodiments of the present disclosure.

FIG. 6 shows an illustrative example of process 600 for training a machine learning (ML)-based intelligence engine for determining the status of tracked assets, in accordance with one or more example embodiments of the present disclosure. In at least one embodiment, some or all of the process 600 (or any other processes described herein, or variations and/or combinations thereof) is performed under the control of one or more computer systems that store computer-executable instructions and may be implemented as code (e.g., computer-executable instructions, one or more computer programs, or one or more applications) executing collectively on one or more processors, by hardware, software, or combinations thereof. The code, in at least one embodiment, is stored on a computer-readable storage medium in the form of a computer program comprising a plurality of computer-readable instructions executable by one or more processors. The computer-readable storage medium, in at least one embodiment, is a non-transitory computer-readable medium. In at least one embodiment, at least some of the computer-readable instructions usable to perform the process 600 are not stored solely using transitory signals (e.g., a propagating transient electric or electromagnetic transmission). A non-transitory computer-readable medium does not necessarily include non-transitory data storage circuitry (e.g., buffers, caches, and queues) within transceivers of transitory signals. Process 600 may be implemented in the context of various systems and methods described elsewhere in this disclosure, such as those discussed in connection with FIGS. 1-5. In at least one embodiment, process 600 or a portion thereof is implemented by one or more computer systems that manage a supply chain network. Process 600 may be implemented at least in part using any suitable system, such as those described in connection with FIG. 8.

In at least one embodiment, process 600 comprises a step 602 to obtain environmental sensor data for training a ML-based intelligence engine. It is understood that the above descriptions are for purposes of illustration and are not meant to be limiting. In various embodiments, the sensor data is indirect sensor data collected from a tracking device attached to an asset. An attached tracking device may be an Internet-of-Things (IoT) embedded device that includes various sensors to collect metrics about the package while it is in transit. Examples of sensors may include GPS receivers; temperature sensors; light sensor, pressure sensor, moisture sensor, shock and impact sensors; clocks, and more. The tracking device may collect metrics at regular intervals specified by an authorized user and transmit the collected metrics to the organization's computer network. These metrics may be used to determine the status of assets using environmental data. The tracking device may be attached to the package in any suitable manner. The attached tracking device may be adhered to the side of the package, included inside the package, and so on. The environmental sensor data may be historical sensor data collected from previous usages of the tracking device that was provided to a data ingestion engine.

In at least one embodiment, process 600 comprises a step 604 to obtain asset workflow information, wherein the asset workflow may be selected or determined based on metadata associated with an asset. It is understood that the above descriptions are for purposes of illustration and are not meant to be limiting. In various embodiments, asset workflow information refers to a data structure or other suitable format for encoding an expected flow for an asset, or a portion thereof. For example, an expected flow for an asset may be that it is transported from a warehouse to a facility such as an office where it is received and stored. As another example, a manufacturing component may be an asset that is received by a manufacturing facility, stored in a storage cabinet, removed from the storage cabinet, transported to a workstation, and then consumed or returned for reverse logistics.

In various embodiments, the status of an asset is encoded as asset workflow information. In some embodiments, asset workflow information is generated through user inputs or through a machine learning process. For example, asset workflow information may be represented as a finite state machine with various states—unopened/unused, transported to a workstation, used/consumed, returned to locker, etc. In various embodiments, the possible states and state transitions of the finite state machine are determined using machine learning from historical asset tracking data that is collected for different types of use cases. Environmental data collected by sensors may include, for example, geolocation data (GPS coordinates), temperature data, time data, proximity data, and so forth. Embodiments of the present disclosure relate to the use of different types of environmental data to determine state information regarding the status of an asset. In various embodiments, asset workflow information is represented as a finite state machine, for example, as described in connection with FIG. 3.

In at least one embodiment, process 600 comprises a step 606 to use the ML-based intelligence engine to generate, based on the environmental sensor data and the asset workflow information, an inferred state. It is understood that the above descriptions are for purposes of illustration and are not meant to be limiting. In various embodiments, an intelligence engine is used to process data from data ingestion engine (e.g., environmental sensor data), asset workflow information for a particular asset or supply chain workflow, and determine a status of the asset. The status may correspond to a state within a finite state machine. In some embodiments, changes in environment sensor data readings of one or more types of environmental sensor data may indicate a status change of an asset. In various embodiments, consistent readings over a period of time may indicate a status change of an asset. In various embodiments, a combination of different types of environmental sensor data may indicate a change in status. For example, GPS and geolocation-based systems may perform poorly when determining whether an asset was dropped off outside of a building as opposed to inside the building, as the fidelity of GPS-based systems can introduce errors of up to several meters. These challenges can make the status of an asset more difficult to determine based solely on conventional means.

In at least one embodiment, process 600 comprises a step 608 to obtain ground truth data associated with the environmental sensor data. It is understood that the above descriptions are for purposes of illustration and are not meant to be limiting. Ground truth data may be in the form of direct sensor data such data recorded as to the actual status of the asset, such as being manually scanned as being received at the warehouse. It should be noted that this manual scanning step may be performed during the training of the intelligence engine, but may be eliminated or considered redundant once the intelligence engine has been trained to a level of accuracy that is acceptable. Direct sensor data may be withheld from the training input data and instead used as ground truth data to train and refine the ML-based model. In various embodiments, the user receives the notification of a putative state transition and is able to provide customer feedback that indicates whether the inference was correct or incorrect. In this way, the customer feedback may be viewed as ground truth data that can be used to train an artificial intelligence (AI) or machine learning (ML) model. In various embodiments, a physical environment such as a warehouse, hospital, or office may be provisioned with sensors, emitters, or other data collection and/or data producing systems during training. This apparatus may be used to create a richer set of training data that can be used as inputs and/or labels for training a ML-based model. Such a setup may be impractical or impossible to provision in all production environments, but may be useful for bootstrapping or initial creation of the ML-based intelligence engine.

In at least one embodiment, process 600 comprises a step 610 to update the ML-based intelligence engine based on the inferred state and the ground truth data. It is understood that the above descriptions are for purposes of illustration and are not meant to be limiting. For example, various parameters of the ML-based model may be updated to improve the accuracy of the ML-based model according to whether the inferred state is correct or incorrect. For example, a loss function may be computed to determine a loss that refers to a difference between a predicted value (e.g., inferred state) and a ground truth value. A gradient of the loss function may be calculated with respect to the models' weights. One or more weights may be updated based on the gradients to reduce the magnitude of loss. Accordingly, a ML-based intelligence engine may be generated or refined using techniques described above.

Figure 7:
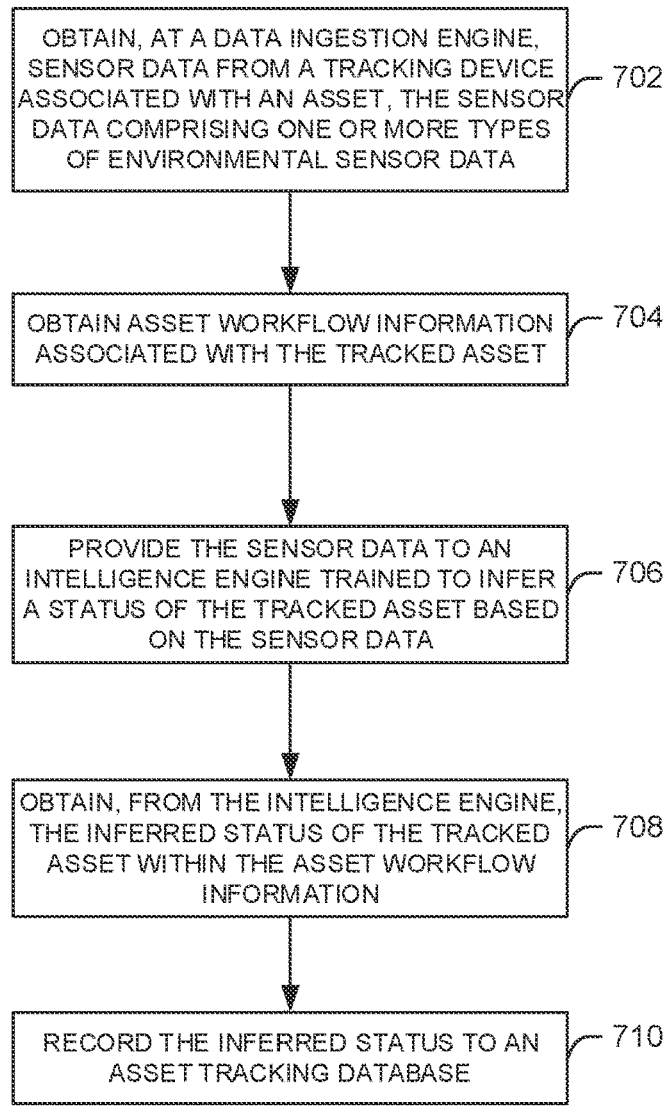
FIG. 7 shows an illustrative example of a process for training a machine learning (ML)-based intelligence engine for determining the status of tracked assets, in accordance with one or more example embodiments of the present disclosure.

FIG. 7 shows an illustrative example of process 700 for training a machine learning (ML)-based intelligence engine for determining the status of tracked assets, in accordance with one or more example embodiments of the present disclosure. In at least one embodiment, some or all of the process 700 (or any other processes described herein, or variations and/or combinations thereof) is performed under the control of one or more computer systems that store computer-executable instructions and may be implemented as code (e.g., computer-executable instructions, one or more computer programs, or one or more applications) executing collectively on one or more processors, by hardware, software, or combinations thereof. The code, in at least one embodiment, is stored on a computer-readable storage medium in the form of a computer program comprising a plurality of computer-readable instructions executable by one or more processors. The computer-readable storage medium, in at least one embodiment, is a non-transitory computer-readable medium. In at least one embodiment, at least some of the computer-readable instructions usable to perform the process 700 are not stored solely using transitory signals (e.g., a propagating transient electric or electromagnetic transmission). A non-transitory computer-readable medium does not necessarily include non-transitory data storage circuitry (e.g., buffers, caches, and queues) within transceivers of transitory signals. Process 700 may be implemented in the context of various systems and methods described elsewhere in this disclosure, such as those discussed in connection with FIGS. 1-5. In at least one embodiment, process 700 or a portion thereof is implemented by one or more computer systems that manage a supply chain network. Process 700 may be implemented at least in part using any suitable system, such as those described in connection with FIG. 8.

In at least one embodiment, process 700 comprises a step 702 to obtain, at a data ingestion engine, sensor data from a tracking device associated with an asset, the sensor data comprising one or more types of environmental sensor data. It is understood that the above descriptions are for purposes of illustration and are not meant to be limiting. The data ingestion engine may be implemented according to one or more of FIGS. 1-5. A data ingestion may be configured to collect data that is used by downstream components. Data ingestion engine may be responsible for storing and providing access to tracking data for assets as they move through a supply chain environment. In some embodiments, data ingestion engine is implemented using a database system to store tracking data. Tracking data may include various information about a package collected from on-board sensors, such as GPS receivers; temperature sensors; light sensor, pressure sensor, moisture sensor, shock and impact sensors; clocks, and more. In some embodiments, data ingestion engine is also responsible for accessing and storing external data. External data may refer to data external from the sensors on a tracking device. This information may include information about the environment of the supply chain, such as weather data, traffic data, presence data, and so on and so forth. Data collected by data ingestion engine may be used by one or more downstream components of a supply chain management system. This indirect sensor data may be used to indirectly determine or infer the status of a tracked asset, in accordance with the present disclosure.

In at least one embodiment, process 700 comprises a step 704 to obtain asset workflow information associated with the tracked asset, wherein the asset workflow may be selected or determined based on metadata associated with an asset. It is understood that the above descriptions are for purposes of illustration and are not meant to be limiting. In various embodiments, asset workflow information refers to a data structure or other suitable format for encoding an expected flow for an asset, or a portion thereof. For example, an expected flow for an asset may be that it is transported from a warehouse to a facility such as an office where it is received and stored. As another example, a manufacturing component may be an asset that is received by a manufacturing facility, stored in a cabinet, removed from the cabinet, transported to a workstation, and then consumed or returned for reverse logistics. In various embodiments, the status of an asset is encoded as asset workflow information. In some embodiments, asset workflow information is generated through user inputs or through a machine learning process. For example, asset workflow information may be represented as a finite state machine with various states—unopened/unused, transported to a workstation, used/consumed, returned to locker, etc. In various embodiments, the possible states and state transitions of the finite state machine are determined using machine learning from historical asset tracking data that is collected for different types of use cases. Environmental data collected by sensors may include, for example, geolocation data (GPS coordinates), temperature data, time data, proximity data, and so forth. Embodiments of the present disclosure relate to the use of different types of environmental data to determine state information regarding the status of an asset. Asset workflow information may be implemented according to techniques described in connection with FIG. 3.

In at least one embodiment, process 700 comprises a step 706 to provide the sensor data to an intelligence engine trained to infer a status of the tracking device based on the sensor data. The inferred status may correspond to a state within the asset workflow information. It is understood that the above descriptions are for purposes of illustration and are not meant to be limiting. Intelligence engine 206 may be used to process data from data ingestion engine 202 (e.g., environmental sensor data), asset workflow information 204 for a particular asset or supply chain workflow, and determine a status of the asset. The status may correspond to a state within a finite state machine. In some embodiments, changes in environment sensor data readings of one or more types of environmental sensor data may indicate a status change of an asset. In various embodiments, consistent readings over a period of time may indicate a status change of an asset. In various embodiments, a combination of different types of environmental sensor data may indicate a change in status. For example, GPS and geolocation-based systems may perform poorly when determining whether an asset was dropped off outside of a building as opposed to inside the building, as the fidelity of GPS-based systems can introduce errors of up to several meters. These challenges can make the status of an asset more difficult to determine based solely on conventional means.

In various embodiments described herein, the status of an asset is tracked based on one or more types of environmental sensor data collected by data ingestion engine and intelligence engine is configured to determine a state classification for a tracked asset. The possible states may be defined by asset workflow information. Then, recommendations, notifications, categorizations, or other types of downstream actions may be taken based on the determination. As an example, temperature sensors may be used to continuously collect temperature data for an asset while it is in transit. The asset may, for example, be a temperature-sensitive asset that is transported in a truck under refrigerated conditions. The tracking device may be physically attached to the asset or a box or other housing for the asset. Upon arrival at a destination, the asset may be unloaded and the tracking device may be physically detached from the asset. The tracking device may be returned to the shipper and may be reused for tracking the shipment of other assets. In various embodiments, the status of the tracking device may be determined based on temperature data. For example, when the tracking device is in cold temperature environment, it may be inferred that the asset is still in transit, but a sudden and prolonged increase in temperature may indicate that the asset has been delivered, and that the status of the tracking device may be considered as "unpaired" and may be allocated or reserved for subsequent use. In various embodiments, the logical classification or inference is made further based on geolocation data—for example, the asset being located within the geofence. The additional signals may be used to develop greater confidence that the increase in temperature is due to the delivery of the asset and not due to a failure in a refrigeration unit, for example. In at least one embodiment, process 700 comprises a step 708 to obtain, from the intelligence engine, the inferred status of the tracked asset within the asset flow information. It is understood that the above descriptions are for purposes of illustration and are not meant to be limiting. The inferred status information may indicate a state within a finite state machine that the environmental sensor data indicates is current or active. In various embodiments, anomaly detection or low confidence in the state of the tracked asset may be used to flag potentially anomalous or unexpected circumstances. For example, consider an embodiment consistent with FIG. 3 where the manufacturing component is retrieved and then taken to an unexpected location. For example, emitters located throughout a manufacturing facility may detect that the manufacturing component is being unexpectedly taken out of the facility, which may be an indication of potential theft. In various embodiments, a downstream notification may be sent to security systems or personnel, a beeper on the tracking device may be activated to produce sound and/or light-based noise, and so forth. In various embodiments, anomalies can be detected based on environmental sensor data indicating low confidence of the present state of the asset.

In at least one embodiment, process 700 comprises a step 710 to record the inferred status to an asset tracking database. It is understood that the above descriptions are for purposes of illustration and are not meant to be limiting. As noted above, an intelligence engine may be used to determine the status of a tracked asset that would not otherwise be directly or intuitively associated with the status—for example, location-related status information may be inferred based on temperature data. This type of environmental sensor data may be used to indirectly determine or infer the status of a tracked asset, and may be used in addition or in combination with direct means of measuring status. In various embodiments, the status of tracked assets in a supply chain context are automatically updated in an asset tracking database in response to inferences determined based on environmental sensor data. For example, a tracking device may be programmatically linked to and/or unlinked from an asset without requiring any manual intervention, according to at least one embodiment of the present disclosure. In various embodiments, the same or separate database is used to track the status of tracking devices, for example, as being paired or unpaired, and various other information regarding the tracking devices may be recorded to provide for more granular status information relating to the state of a tracking device.

In various embodiments, updates to asset tracking database may be used to trigger to performance of downstream steps. For example, one or more downstream systems such as downstream systems may receive notifications or events from suitable event notification mechanism. Examples of downstream systems may include for example, manufacturing inventory system that are used to determine the inventory levels of different types of manufacturing components. For example, when applying several layers of a protective chemical coating, there may be multiple containers of the coating used that are taken to a workstation but not all are used. In such a scenario, it may be the case that two of the containers will be marked as being consumed and the other two may be returned to the inventory of available materials. In some cases, however, the other open coating containers may be marked as partially used and may be subject to a reverse logistics flow that is initiated based on updates to records in asset tracking database 208.

Figure 8:
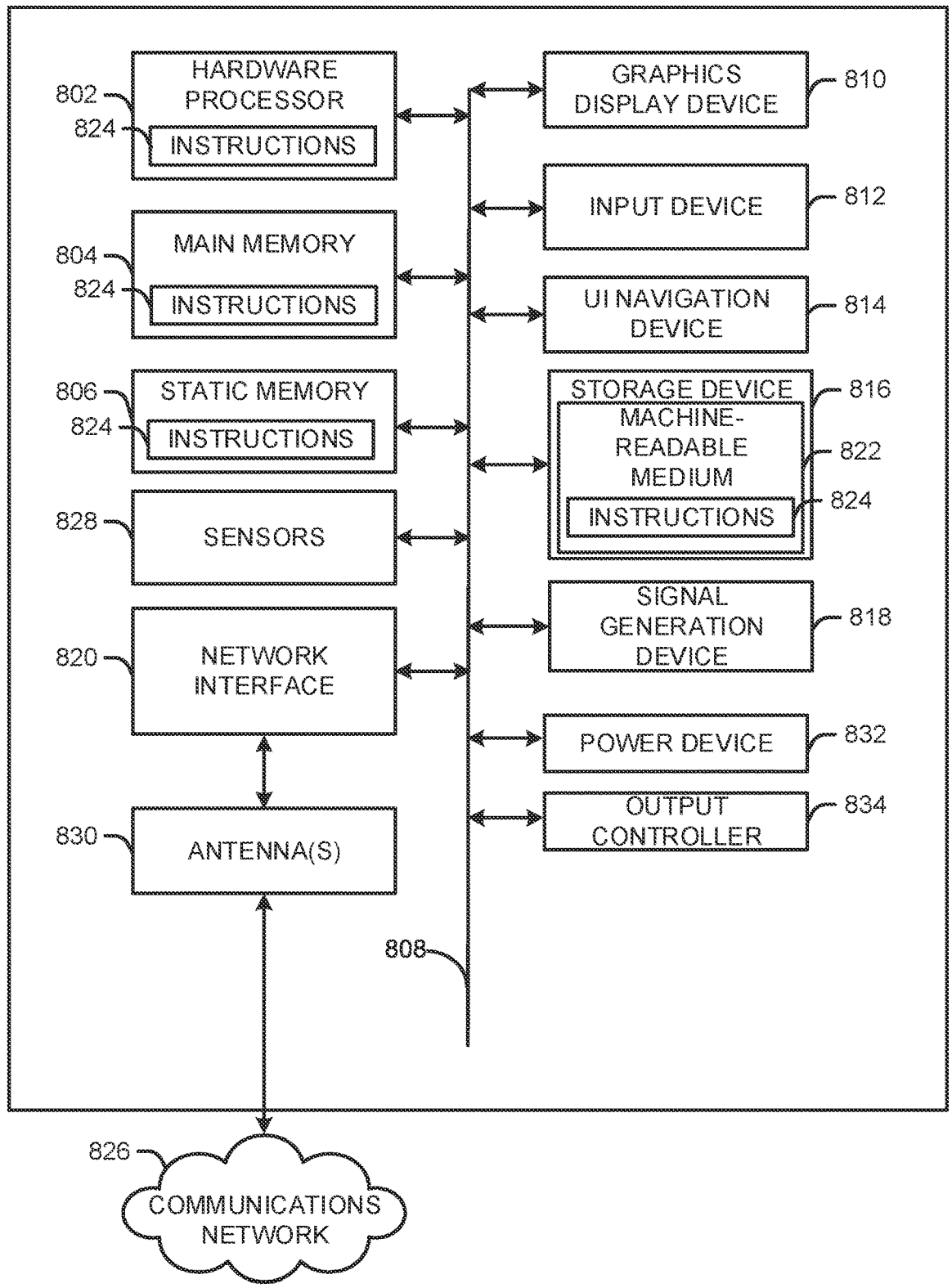
FIG. 8 illustrates a block diagram of an example machine upon which any of one or more techniques (e.g., methods) may be performed, in accordance with one or more example embodiments of the present disclosure.

FIG. 8 illustrates a block diagram of an example of a machine 800 or system upon which any one or more of the techniques (e.g., methodologies) discussed herein may be performed. In other embodiments, the machine 800 may operate as a standalone device or may be connected (e.g., networked) to other machines. In a networked deployment, the machine 800 may operate in the capacity of a server machine, a client machine, or both in server-client network environments. The machine 800 may be a wearable device or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer-readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 800 may include any combination of the illustrated components. For example, the machine 800 may include a hardware processor 802 (e.g., a central processing unit (CPU), a graphics processing unit (GPU), a tensor processing unit (TPU) including an artificial intelligence application-specific integrated circuit (ASIC), a hardware processor core, or any combination thereof), a main memory 804 and a static memory 806, some or all of which may communicate with each other via an interlink (e.g., bus) 808. The machine 800 may further include a power management device 832, a graphics display device 810, an alphanumeric input device 812 (e.g., a keyboard), and a user interface (UI) navigation device 814 (e.g., a mouse). In an example, the graphics display device 810, alphanumeric input device 812, and UI navigation device 814 may be a touch screen display. The machine 800 may additionally include a storage device (i.e., drive unit) 816, a signal generation device 818 (e.g., a data signal), a network interface device/transceiver 820 coupled to antenna(s) 830, and one or more sensors 828, such as a sound detecting sensor (e.g., a microphone), accelerometers, magnetometers, location sensors, and the like. The machine 800 may include an output controller 834, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, other sensors, etc.)).

The storage device 816 may include a machine-readable medium 822 on which is stored one or more sets of data structures or instructions 824 (e.g., software) embodying or utilized by any one or more of the techniques or functions described herein. The instructions 824 may also reside, completely or at least partially, within the main memory 804, within the static memory 806, or within the hardware processor 802 during execution thereof by the machine 800. In an example, one or any combination of the hardware processor 802, the main memory 804, the static memory 806, or the storage device 816 may constitute machine-readable media.

While the machine-readable medium 822 is illustrated as a single medium, the term "machine-readable medium" may include a single medium or multiple media (e.g., a centralized or distributed database, and/or associated caches and servers) configured to store the one or more instructions 824.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read-only memory (ROM); random-access memory (RAM); magnetic disk storage media; optical storage media; a flash memory, etc.

The term "machine-readable medium" may include any medium that is capable of storing, encoding, or carrying instructions for execution by the machine 800 and that cause the machine 800 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include nonvolatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks. The instructions 824 may further be transmitted or received over a communications network 826 using a transmission medium via the network interface device/transceiver 820 utilizing any one of a number of transfer protocols (e.g., frame relay, internet protocol (IP), transmission control protocol (TCP), user datagram protocol (UDP), hypertext transfer protocol (HTTP), etc.). Example communications networks may include DOCSIS, fiber optic, a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.8 family of standards known as Wi-Fi®, IEEE 802.16 family of standards known as WiMax®), IEEE 802.15.4 family of standards, and peer-to-peer (P2P) networks, among others. In an example, the network interface device/transceiver 820 may include one or more physical jacks (e.g., Ethernet, coaxial, or phone jacks) or one or more antennas to connect to the communications network 826. In an example, the network interface device/transceiver 820 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 800 and includes digital or analog communications signals or other intangible media to facilitate communication of such software.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cable box, a wearable smart device, cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

Some embodiments may be used in conjunction with various devices and systems, for example, a wearable smart device, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a nonmobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple-input multiple-output (MIMO) transceiver or device, a single-input multiple-output (SIMO) transceiver or device, a multiple-input single-output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, DOCSIS, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

Embodiments according to the disclosure are in particular disclosed in the attached claims directed to a method, a storage medium, a device and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A method for automatically tracking a plurality of assets in a supply chain network, the method comprising:

obtaining, at a first time and by one or more processors of a remote system in the supply chain network, first sensor data collected by a plurality of Internet-of-Things (IoT) tracking devices configured to be attached to a plurality of assets, wherein the remote system is a part of a system including the remote system, the plurality of IoT tracking devices, and a user device;

training, by the one or more processors and using the first sensor data, an intelligence engine configured to generate an inference of a status associated with an asset of the plurality of assets;

obtaining, at a second time and by the one or more processors of the remote system, second sensor data collected from a first IoT tracking device of the plurality of IoT tracking devices, wherein the first IoT tracking device is configured to be attached to a first asset, wherein the second sensor data includes a first wireless signal strength;

determining, by the one or more processors and based on the first wireless signal strength, that the first asset is located at a first location within a facility;

obtaining, at a third time and by the one or more processors of the remote system, third sensor data collected from a first IoT tracking device, wherein the third sensor data includes a second wireless signal strength that is lower than the first wireless signal strength;

determining, by the one or more processors and based on the second wireless signal strength being lower than the first wireless signal strength, that the first asset is located at a second location within the facility or outside of the facility;

presenting, by the one or more processors, a user interface via the user device, the user interface indicating that the first asset is at the first location;

obtaining, at a fourth time and by the one or more processors of the remote system, fourth sensor data and fifth sensor data collected from the first IoT tracking device, wherein the fourth sensor data includes geolocation data and the fifth sensor data includes temperature data;

determining, by the one or more processors and using the temperature, that a temperature of the first asset has increased;

using, by the one or more processors, the intelligence engine to generate an inferred state based on the determination that the temperature has increased instead of the geolocation data, the inferred state indicating that the first asset has been delivered to a third location;

presenting, by the one or more processors and based on the determination that the first asset has been delivered, the user interface via the user device with the indication of the first asset removed from the user interface;

determining, by the one or more processors, ground truth data associated with the first asset, wherein the ground truth data includes at least one of direct sensor data or user feedback;

comparing, by the one or more processors, the inferred state and the ground truth data; and re-training, by the one or more processors, the intelligence engine based on comparing the inferred state and the ground truth data.

2. The method of claim 1, further comprising:

providing, by the one or more processors, the status of the first asset to one or more downstream systems as a notification or event.

3. The method of claim 1, further comprising:
determining, by the one or more processors, asset workflow information associated with the first asset, wherein the asset workflow information indicates an expected workflow associated with the first asset.

4. The method of claim 3, wherein determining the asset workflow information is based on metadata associated with the first asset.

5. The method of claim 3, wherein the asset workflow information is encoded as a finite state machine (FSM).

6. The method of claim 1, further comprising automatically unpairing the tracking device from the asset.

7. The method of claim 1, wherein the geolocation data is obtained using one or more global positioning system (GPS) receivers, and wherein the method further comprises causing an action to be performed based on the geolocation data.

8. A system, comprising:
a plurality of Internet-of-Things (IoT) tracking devices configured to be attached to a plurality of assets in a supply chain network;
a user device;
a remote system comprising:
one or more processors; and
at least one memory storing computer-executable instructions, that when executed by the one or more processors, cause the one or more processors to:
obtain, at a first time, first sensor data collected by the plurality of IoT tracking devices;
train, using the sensor data, an intelligence engine configured to generate an inference of a status of the plurality of assets;
obtain, at a second time, second sensor data collected from a first IoT tracking device of the plurality of IoT tracking devices, wherein the first IoT tracking device is configured to be attached to a first asset;
present a user interface via the user device, the user interface indicating a location of the first asset;
obtain, at a third time, third sensor data and fourth sensor data collected from the first IoT tracking device, wherein the third sensor data includes geolocation data and the fourth sensor data includes temperature data;
determine, using the temperature, that a temperature of the first asset has increased;
generate, by the intelligence engine, an inferred state based on the determination that the temperature has increased instead of the geolocation data;
determine that the first asset has been delivered based on the inferred state;
present, based on the determination that the first asset has been delivered, the user interface via the user device with the indication of the first asset removed from the user interface;
determine ground truth data associated with the first asset, wherein the ground truth data includes at least one of direct sensor data or user feedback;
compare the inferred state and the ground truth data; and
re-train the intelligence engine based on comparing the inferred state and the ground truth data.

9. The system of claim 8, wherein the computer-executable instructions further cause the one or more processors to:
provide the status of the first asset to one or more downstream systems as a notification or event.

10. The system of claim 8, wherein the computer-executable instructions further cause the one or more processors to:
determine asset workflow information associated with the first asset, wherein the asset workflow information indicates an expected workflow associated with the first asset.

11. The system of claim 10, wherein the asset workflow information is encoded as a finite state machine (FSM).

12. The system of claim 10, wherein determining the asset workflow information is based on metadata associated with the first asset.

13. The system of claim 12, wherein the inferred state is associated with geolocation of the first asset, and wherein the sensor data includes at least one of GPS or other location receiver data and manual verification data.

14. The system of claim 13, wherein the sensor data further comprises location data.

15. A non-transitory computer-readable medium including computer-executable instructions stored thereon, which when executed by one or more processors, cause the one or more processors to:
obtain, at a first time, by a remote system in a supply chain network, and from a plurality of IoT tracking devices configured to be attached to a plurality of assets in the supply chain network, first sensor data collected by the plurality of IoT tracking devices;
train, using the first sensors data, an intelligence engine configured to generate an inference of a status associated with an asset;
obtain, at a second time, second sensor data collected from a first IoT tracking device of the plurality of IoT tracking devices, wherein the first IoT tracking device is configured to be attached to a first asset;
present a user interface via a user device, the user interface indicating a location of the first asset;
obtain, at a third time, third sensor data and fourth sensor data collected from the first IoT tracking device, wherein the third sensor data includes geolocation data and the fourth sensor data includes temperature data;
determine, using the temperature, that a temperature of the first asset has increased;
generate, by the intelligence engine, an inferred state based on the determination that the temperature has increased instead of the geolocation data;
determine that the first asset has been delivered based on the inferred state;
present, based on the determination that the first asset has been delivered, the user interface via the user device with the indication of the first asset removed from the user interface;
determine ground truth data associated with the first asset, wherein the ground truth data includes at least one of direct sensor data or customer feedback;
compare the inferred state and the ground truth data; and
re-train the intelligence engine based on comparing the inferred state and the ground truth data.

16. The non-transitory computer-readable medium of claim 15, wherein the computer-executable instructions further cause the one or more processors to:
provide the status of the first asset to one or more downstream systems as a notification or event.

17. The non-transitory computer-readable medium of claim 15, wherein the computer-executable instructions further cause the one or more processors to:
determine asset workflow information associated with the first asset, wherein the asset workflow information indicates an expected workflow associated with the first asset.

18. The non-transitory computer-readable medium of claim 17, wherein the asset workflow information is encoded as a finite state machine (FSM).

19. The non-transitory computer-readable medium of claim 15, wherein the sensor data further comprises location data.

20. The non-transitory computer-readable medium of claim 15, wherein the inferred state is associated with geolocation of the first asset, and wherein the sensor data includes at least one of GPS or other location receiver data and manual verification data.

* * * * *